United States Patent
Bak et al.

(10) Patent No.: US 9,632,924 B2
(45) Date of Patent: Apr. 25, 2017

(54) USING MEMORY COMPRESSION TO REDUCE MEMORY COMMIT CHARGE

(71) Applicant: Microsoft Technology Licensing, LLC, Redmond, WA (US)

(72) Inventors: Yevgeniy M. Bak, Redmond, WA (US); Mehmet Iyigun, Kirkland, WA (US); Landy Wang, Honolulu, HI (US); Arun U. Kishan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 90 days.

(21) Appl. No.: 14/635,302

(22) Filed: Mar. 2, 2015

(65) Prior Publication Data

US 2016/0259720 A1 Sep. 8, 2016

(51) Int. Cl.
*G06F 12/00* (2006.01)
*G06F 12/02* (2006.01)
*G06F 12/06* (2006.01)
*G06F 12/08* (2016.01)
*G06F 9/46* (2006.01)
*G06F 9/50* (2006.01)

(52) U.S. Cl.
CPC .......... *G06F 12/023* (2013.01); *G06F 9/461* (2013.01); *G06F 9/5022* (2013.01); *G06F 12/0623* (2013.01); *G06F 12/08* (2013.01); *G06F 12/0261* (2013.01); *G06F 2212/1044* (2013.01); *G06F 2212/2532* (2013.01); *G06F 2212/401* (2013.01)

(58) Field of Classification Search
None
See application file for complete search history.

(56) References Cited

U.S. PATENT DOCUMENTS

| 5,101,485 A | 3/1992 | Perazzoli, Jr. |
| 5,125,086 A | 6/1992 | Perazzoli |
| 5,247,687 A | 9/1993 | Eilert et al. |

(Continued)

FOREIGN PATENT DOCUMENTS

| CN | 100530142 | 8/2009 |
| EP | 0097256 | 1/1984 |

(Continued)

OTHER PUBLICATIONS

"Commit Charge", Retrieved from the internet at: http://web.archive.org/web/20150225012244/http://en.wikipedia.org/wiki/Commit_charge—on Apr. 28, 2016, 2 pages.

(Continued)

*Primary Examiner* — John A Lane

(57) ABSTRACT

A memory manager in a computing device allocates memory to programs running on the computing device, the amount of memory allocated to a program being a memory commit for the program. When a program is in a state where the program can be terminated, the content of the memory pages allocated to the program is compressed, and an amount of the memory commit for the program that can be released is determined. This amount of memory commit is the amount that was committed to the program less any amount still storing (in compressed format) information (e.g., data or instructions) for the program. The determined amount of memory commit is released, allowing that amount of memory to be consumed by other programs as appropriate.

20 Claims, 5 Drawing Sheets

(56) References Cited

U.S. PATENT DOCUMENTS

| | | |
|---|---|---|
| 5,388,242 A | 2/1995 | Jewett |
| 5,394,537 A | 2/1995 | Courts et al. |
| 5,517,643 A | 5/1996 | Davy |
| 5,555,399 A | 9/1996 | Waldron et al. |
| 5,594,881 A | 1/1997 | Fecteau |
| 5,628,023 A | 5/1997 | Bryant |
| 5,696,926 A | 12/1997 | Culbert |
| 5,758,174 A | 5/1998 | Crump et al. |
| 5,802,599 A | 9/1998 | Cabrera et al. |
| 5,826,057 A | 10/1998 | Okamoto et al. |
| 5,966,735 A | 10/1999 | Noel et al. |
| 6,128,713 A | 10/2000 | Eisler et al. |
| 6,298,422 B1 | 10/2001 | Spilo et al. |
| 6,330,572 B1 | 12/2001 | Sitka |
| 6,349,372 B1 | 2/2002 | Benveniste et al. |
| 6,442,664 B1 | 8/2002 | Maynard et al. |
| 6,473,842 B1 | 10/2002 | Tsutsumi |
| 6,496,909 B1 | 12/2002 | Schimmel |
| 6,496,912 B1 | 12/2002 | Fields, Jr. et al. |
| 6,516,397 B2 | 2/2003 | Roy |
| 6,564,305 B1 | 5/2003 | Moore |
| 6,681,239 B1 | 1/2004 | Munroe et al. |
| 6,877,081 B2 | 4/2005 | Herger |
| 6,956,507 B2 | 10/2005 | Castelli et al. |
| 6,968,424 B1 | 11/2005 | Danilak |
| 7,024,512 B1 | 4/2006 | Franaszek |
| 7,185,155 B2 | 2/2007 | Sechrest et al. |
| 7,197,590 B2 | 3/2007 | Chiu |
| 7,437,529 B2 | 10/2008 | Burugula et al. |
| 7,475,183 B2 | 1/2009 | Traut et al. |
| 7,587,572 B1 | 9/2009 | Stenstrom |
| 7,610,437 B2 | 10/2009 | Sinclair et al. |
| 7,624,240 B1 | 11/2009 | Colbert et al. |
| 7,698,513 B2 | 4/2010 | Sechrest et al. |
| 7,797,510 B1 | 9/2010 | Case et al. |
| 7,895,242 B2 | 2/2011 | Ergan |
| 8,015,367 B1 | 9/2011 | Rao et al. |
| 8,099,568 B2 | 1/2012 | Colbert et al. |
| 8,386,740 B2 | 2/2013 | Devendra et al. |
| 8,484,405 B2 | 7/2013 | Mashtizadeh et al. |
| 8,495,267 B2 | 7/2013 | Abali et al. |
| 8,516,005 B2 | 8/2013 | Ergan et al. |
| 8,539,186 B2 | 9/2013 | Sechrest et al. |
| 8,832,411 B2 | 9/2014 | Iyigun et al. |
| 9,081,702 B2 | 7/2015 | Iyigun et al. |
| 2002/0073298 A1 | 6/2002 | Geiger et al. |
| 2002/0147893 A1 | 10/2002 | Roy et al. |
| 2003/0037060 A1 | 2/2003 | Kuehnel |
| 2003/0079081 A1 | 4/2003 | Okada |
| 2004/0030847 A1 | 2/2004 | Tremaine |
| 2004/0068627 A1 | 4/2004 | Sechrest et al. |
| 2005/0132161 A1 | 6/2005 | Makela et al. |
| 2006/0161912 A1 | 7/2006 | Barrs et al. |
| 2007/0005911 A1 | 1/2007 | Yang |
| 2007/0101108 A1 | 5/2007 | Grossman et al. |
| 2007/0156386 A1 | 7/2007 | Guenthner |
| 2009/0112949 A1 | 4/2009 | Ergan |
| 2009/0327621 A1 | 12/2009 | Kliot et al. |
| 2011/0072235 A1 | 3/2011 | Deming et al. |
| 2011/0107007 A1 | 5/2011 | van Riel et al. |
| 2011/0113432 A1 | 5/2011 | Ergan et al. |
| 2011/0153978 A1 | 6/2011 | Chalemin et al. |
| 2011/0238943 A1 | 9/2011 | Devendran et al. |
| 2011/0271070 A1 | 11/2011 | Worthington et al. |
| 2012/0036325 A1 | 2/2012 | Mashtizadeh et al. |
| 2012/0151127 A1 | 6/2012 | Lim |
| 2012/0233438 A1 | 9/2012 | Bak et al. |
| 2012/0239899 A1 | 9/2012 | Adderly et al. |
| 2013/0031293 A1 | 1/2013 | Van Riel |
| 2013/0036299 A1 | 2/2013 | Itoh |
| 2013/0159662 A1 | 6/2013 | Iyigun et al. |
| 2013/0160011 A1 | 6/2013 | Corrie |
| 2013/0326170 A1 | 12/2013 | Kilari et al. |
| 2014/0006745 A1 | 1/2014 | Fontenot et al. |
| 2014/0052946 A1 | 2/2014 | Kimmel |
| 2014/0149634 A1 | 5/2014 | Tosatti et al. |
| 2014/0164686 A1 | 6/2014 | Choi et al. |
| 2014/0189195 A1 | 7/2014 | Chen et al. |
| 2014/0189281 A1 | 7/2014 | Sokol, Jr. |
| 2014/0244603 A1 | 8/2014 | Arges et al. |
| 2014/0282589 A1 | 9/2014 | Kuang et al. |
| 2014/0351552 A1 | 11/2014 | Iyigun et al. |
| 2014/0372715 A1 | 12/2014 | Bak et al. |
| 2015/0106582 A1 | 4/2015 | Mai et al. |
| 2015/0178222 A1 | 6/2015 | Hopper et al. |
| 2015/0242432 A1 | 8/2015 | Bak et al. |
| 2015/0269111 A1 | 9/2015 | Bak et al. |
| 2016/0306738 A1 | 10/2016 | Bak et al. |

FOREIGN PATENT DOCUMENTS

| | | |
|---|---|---|
| EP | 0346039 | 12/1989 |
| EP | 0723229 | 7/1996 |
| EP | 1406174 | 4/2004 |
| KR | 1020110085989 | 7/2011 |
| KR | 101221241 | 1/2013 |
| WO | WO 9518997 | 7/1995 |

OTHER PUBLICATIONS

"International Preliminary Report on Patentability", Application No. PCT/US2015/021129, Feb. 29, 2016, 6 pages.

"International Preliminary Report on Patentability", Application No. PCT/US2015/016237, Feb. 23, 2016, 8 pages.

"International Search Report and Written Opinion", Application No. PCT/US2015/021129, May 28, 2015, 10 Pages.

"International Search Report and Written Opinion", Application No. PCT/US2016/018559, May 18, 2016, 14 pages.

"Non-Final Office Action", U.S. Appl. No. 13/917,149, Oct. 23, 2015, 17 pages.

"Non-Final Office Action", U.S. Appl. No. 14/221,829, Feb. 26, 2016, 27 pages.

Tuduce,"Adaptive Main Memory Compression", Retrieved from <http://www.lst.inf.ethz.ch/research/publications/publications/USENIX_2005/USENIX_2005.pdf>, 2005, 14 pages.

"International Search Report and Written Opinion", Application No. PCT/US2016/024597, May 18, 2016, 12 pages.

"Final Office Action", U.S. Appl. No. 13/042,128, Nov. 21, 2013, 15 pages.

"Foreign Office Action", CN Application No. 201210540976.9, Dec. 3, 2014, 13 Pages.

"Hack 92 Getting the Most Out of Your RAM", Retrieved from <http://www.csie.ntu.edu.tw/~b90047/ebook/winXPhack/0596005113_winxphks-chp-11-sect-3.html> on Oct. 28, 2014, May 8, 2007, 3 pages.

"How to determine the appropriate page file size for 64-bit versions of Windows", Retrieved from <> on Oct. 28, 2014, Nov. 27, 2013, 3 pages.

"How VMware vSphere is saving physical memory?", Retrieved from <http://www.unixarena.com/2014/07/how-vmware-vsphere-is-saving-physical-memory.html> on Oct. 28, 2014, Jul. 31, 2014, 3 pages.

"HP OpenVMS System Services Reference Manual", Retrieved from <http://h71000www7.hp.com/doc/83final/4527/4527pro_022.html>> on Dec. 1, 2011, 7 pages.

"International Search Report and Written Opinion", Application No. PCT/US2012/069602, May 30, 2013, 10 pages.

"International Search Report and Written Opinion", Application No. PCT/US2013/060505, Feb. 7, 2014, 10 pages.

"Microsoft "Working Set"", Retrieved from <<http://msdn.microsoft.com/en-us/library/windows/desktop/cc441804%28d=printer,v=vs.85%29>> May 22, 2014, 2 pages.

"Non Final Office Action", U.S. Appl. No. 13/042,128, May 2, 2014, 13 pages.

"Non-Final Office Action", U.S. Appl. No. 11/933,364, Jul. 22, 2010, 10 pages.

"Non-Final Office Action", U.S. Appl. No. 13/006,229, Oct. 1, 2012, 15 pages.

(56) References Cited

OTHER PUBLICATIONS

"Non-Final Office Action", U.S. Appl. No. 13/006,229, May 25, 2012, 6 pages.
"Non-Final Office Action", U.S. Appl. No. 13/042,128, Apr. 3, 2013, 12 pages.
"Non-Final Office Action", U.S. Appl. No. 13/326,182, Aug. 16, 2013, 5 pages.
"Non-Final Office Action", U.S. Appl. No. 14/456,128, Oct. 7, 2014, 5 pages.
"Notice of Allowance", U.S. Appl. No. 11/933,364, Nov. 16, 2010, 6 pages.
"Notice of Allowance", U.S. Appl. No. 13/006,229, Apr. 4, 2013, 12 pages.
"Notice of Allowance", U.S. Appl. No. 13/326,182, Jan. 15, 2014, 7 Pages.
"Notice of Allowance", U.S. Appl. No. 13/326,182, May 9, 2014, 7 Pages.
"Notice of Allowance", U.S. Appl. No. 13/326,182, Jul. 2, 2014, 7 Pages.
"Notice of Allowance", U.S. Appl. No. 14/456,128, Mar. 6, 2015, 8 pages.
"Supplemental Notice of Allowance", U.S. Appl. No. 13/006,229, Jul. 9, 2013, 2 pages.
"Understanding Memory Resource Management in VMware ESX 4.1", Retrieved from <http://www.vmware.com/files/pdf/techpaper/vsp_41_perf_memory_mgmt.pdf> on Mar. 21, 2013, Jul. 21, 2010, 25 pages.
"VMware vSphere 4—ESX and vCenter Server—Memory Compression", Retrieved from <http://pubs.vmware.com/vsphere-4-esx-vcenter/index.jsp?topic=/com.vmware.vsphere.resourcemanagement.doc_41/managing_memory_resources/c_memory_compression.html> on Oct. 28, 2014, 2009, 1 page.
"Working Set", Retrieved From: ,http://msdn.microsoft.com/en-us/library/windows/desktop/cc441804(v=vs.85).aspx> Feb. 19, 2014, Nov. 16, 2013, 1 Page.
Azimi, et al., "PATH: Page Access Tracking to Improve Memory Management", Proc. 6th Intl Symposium on Memory Management, Oct. 2007, 10 pages.
Carp, "The Standby List and Storage Overprovisioning", Retrieved from <http://fsfilters.blogspot.in/2012/04/standby-list-and-storage.html> on Mar. 22, 2013, Apr. 19, 2012, 5 pages.
Clark, et al., "Selective Page Updating", IP.com Prior Art Database Technical Disclosure, 1987, 3 Pages.
De et al., "Adaptive Compressed Caching: Design and Implementation", IEEE, Retrieved from <http://linuxcompressed.sourceforge.net/docs/files/paper.pdf>, 2003, 15 pages.
Denneman, "Disable ballooning?", Retrieved from <http://frankdenneman.nl/2010/11/29/disable-ballooning/> on Oct. 28, 2014, Nov. 29, 2010, 12 pages.
Dilger, "Compressed Memory in OS X 10.9 Mavericks Aims to Free RAM, Extend Battery Life", Retrieved From: <http://appleinsider.com/articles/13/06/12/compressed-memory-in-os-x-109-mavericks-aims-to-free-ram-extend-battery-life> Jan. 22, 2014, Jun. 12, 2013, 10 Pages.
Freedman, et al., "The Compression Cache: Virtual Memory Compression for Handheld Computers", MIT Lab for Computer Science, Retrieved from <http://www.scs.stanford.edu/mfreed/docs/6.033/compression.pdf>, Mar. 16, 2000, 16 pages.
Gupta, "Compcache: In-Memory Compressed Swapping", Retrieved from <http://lwn.net/Articles/334649/> on Mar. 20, 2013, May 26, 2009, 6 pages.
Huffman, "How to Size Page Files on Windows Systems", Retrieved from <http://mcpmag.com/articles/2011/07/05/sizing-page-files-on-windows-systems.aspx> on Oct. 28, 2014, Jul. 5, 2011, 9 pages.
Jenner, et al., "Address Space Suballocation in a Virtual Storage Environment", IP.com Prior Art Database Technical Disclosure, 1973, 6 Pages.
Russinovich, "Inside the Windows Vista Kernel: Part 2", Retrieved from <http://technet.microsoft.com/en-us/magazine/2007.03.vistakernel.aspx> on Mar. 21, 2013, Mar. 2007, 8 pages.
Russinovich, "Pushing the Limits of Windows: Virtual Memory", Retrieved from <http://blogs.technet.com/b/markrussinovich/archive/2008/11/17/3155406.aspx> on Oct. 28, 2014, Nov. 17, 2008, 10 pages.
Speight, et al., "Delphi: Prediction-Based Page Prefetching to Improve the Performance of Shared Virtual Memory Systems", In Proceedings: International Conference on Parallel and Distributed Processing Techniques and Applications, Jul. 25, 2013, 7 Pages.
Tuduce, "Adaptive Main Memory Compression", Doctoral Dissertation, Swiss Federal Institute of Technology Zurich, Available at <http://www.lst.ethz.ch/research/publications/DISS_ETH_16327/DISS_ETH_16327.pdf>, 2005, 141 pages.
Wilson, et al., "The Case for Compressed Caching in Virtual Memory Systems", USENIX Association, Jun. 6-11, 1999. Retrieved from <http://www.usenix.org/events/usenix99/full_papers/wilson/wilson.pdf>, 1999, 33 pages.
"International Search Report and Written Opinion", Application No. PCT/US2015/016237, Nov. 5, 2015, 10 pages.
"Final Office Action", U.S. Appl. No. 14/221,829, Sep. 22, 2016, 29 pages.
"International Preliminary Report on Patentability", Application No. PCT/US2016/024597, Aug. 23, 2016, 6 pages.
"International Preliminary Report on Patentability", Application No. PCT/US2016/018559, Aug. 24, 2016, 7 pages.
"Non-Final Office Action", U.S. Appl. No. 14/685,977, Sep. 15, 2016, 11 pages.
"Non-Final Office Action", U.S. Appl. No. 14/187,031, Nov. 30, 2016, 18 pages.
"Final Office Action", U.S. Appl. No. 14/685,977, Mar. 7, 2017, 13 pages.
"Notice of Allowance", U.S. Appl. No. 14/221,829, Mar. 9, 2017, 8 pages.

USING MEMORY COMPRESSION TO REDUCE MEMORY COMMIT CHARGE

BACKGROUND

As computer technology has advanced, the performance of computer processors has increased. This increased performance has resulted in more complex computer programs providing increased functionality to users. However, this increased performance is not without its problems. One such problem is that as the computer programs become more complex, they use increased amounts of computer memory. This has led to a need to include more computer memory in computers, increasing the cost of such computers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a determination that a program is in a state from which the program can be terminated is made, an amount of memory having been committed to the program, the amount of memory being a memory commit for the program, and a subset of the amount of memory committed to the program having been used by the program. The amount of memory committed to the program includes multiple memory pages. The content of the memory pages in the subset of memory used by the program is compressed, and an amount of the memory commit for the program that can be released is determined. After the subset of memory used by the program has been compressed, the determined amount of the memory commit for the program is released.

In accordance with one or more aspects, a determination that one or more memory pages of a program are to be accessed is made, the program having had at least part of its memory commit released. An attempt is made to re-obtain the memory commit for at least the one or more memory pages of the program. In response to the attempt to re-obtain the memory commit being successful, the one or more memory pages are allowed to be accessed. In response to the attempt to re-obtain the memory commit being unsuccessful, the program is terminated and re-launched.

BRIEF DESCRIPTION OF THE DRAWINGS

The same numbers are used throughout the drawings to reference like features.

DETAILED DESCRIPTION

Figure 1:
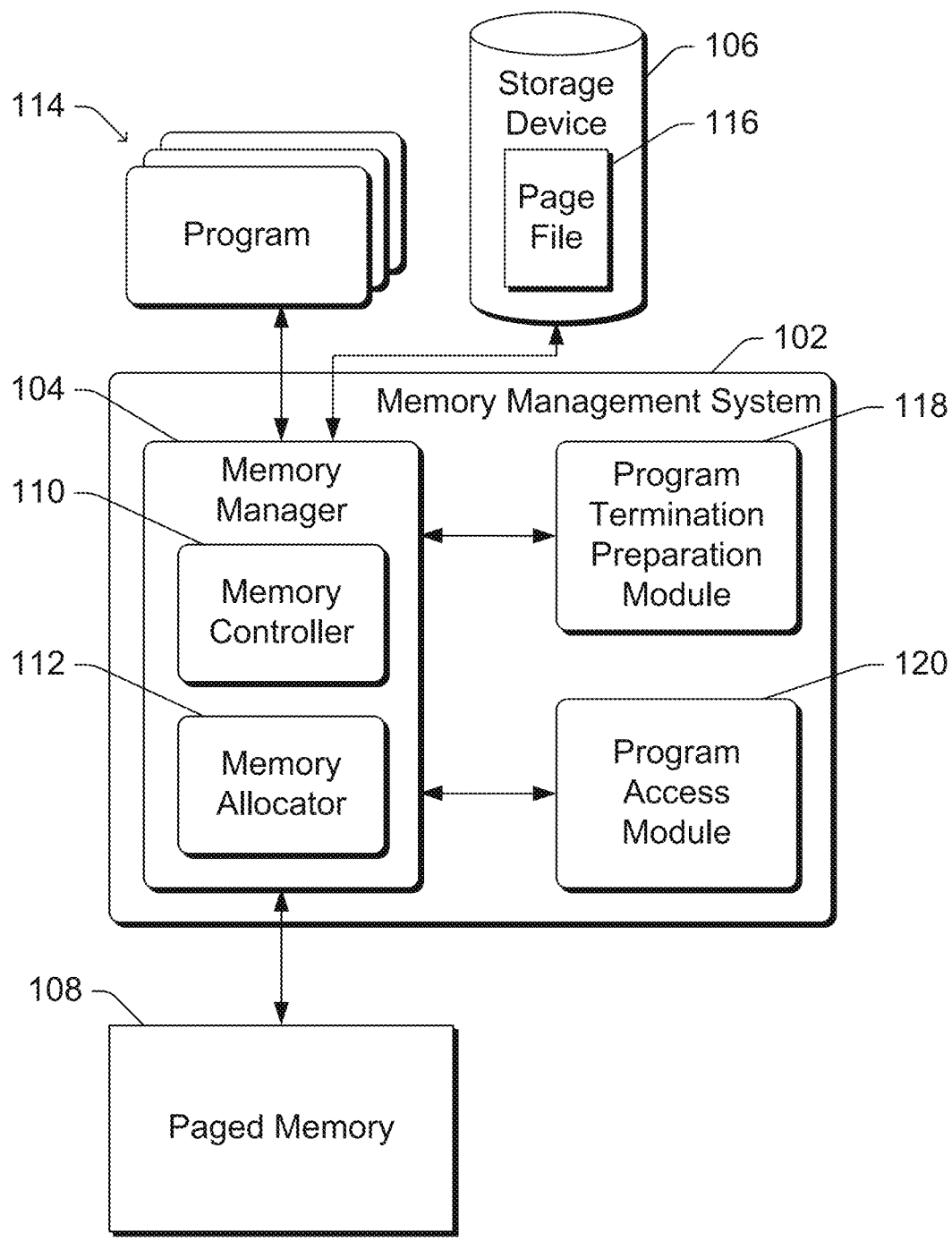
FIG. 1 illustrates an example system employing the using memory compression to reduce memory commit charge in accordance with one or more embodiments.

Using memory compression to reduce memory commit charge is discussed herein. A memory in a computing device is made up of multiple blocks or portions referred to as memory pages (or simply pages). These pages are backed by a page file on a storage device (e.g., a disk), and a memory manager of the computing device manages transferring data for various pages between the memory and the page file as appropriate. The memory manager also allocates amounts of memory to programs running on the computing device.

When memory is allocated to a program, an address space is assigned or allocated to the program. This address space includes the allocated amount of memory, and the memory manager allocates a commit charge for the allocated amount of memory. This allocated amount of memory is the amount of memory that is committed to the program, and is also referred to as the memory commit for the program (or simply the commit for the program). The memory commit guarantees availability of the allocated amount of memory to the program—the memory manager guarantees that if a committed virtual address in the memory allocated to the program is accessed, pages in physical memory (e.g., RAM) can be made available for the address. At the time the memory is allocated to the program, no physical pages need be (but alternatively can be) allocated to the program. A maximum amount of commit charge permissible in the computing device is equal to the amount of physical memory (e.g., RAM) plus the size of all page files on a storage device that backs the physical memory (e.g., RAM).

The content of one or more of the memory pages of a program is compressed. This compression can occur while the program is active (e.g., running or otherwise permitted to access the memory allocated to the program) and/or in response to the program being suspended (or otherwise placed in a non-active state). When a program is suspended, an amount of memory commit for the program that can be released is determined. This amount of memory commit that can be released is the amount that was committed to the program less any amount still storing (in compressed format) information (e.g., data or instructions) for the program. The determined amount of memory commit is released, allowing that released amount of memory commit to be consumed by other programs as appropriate.

When one or more memory pages of a suspended program are to be accessed, such as due to the suspended program being made active again or kernel mode code attaching to the memory space of the suspended program, an attempt to re-acquire the memory commit for those memory pages is made. Depending on what memory has been allocated to what other programs, the attempt may be successful or unsuccessful. If the attempt is successful, then access to the one or more memory pages is permitted. However, if the attempt is unsuccessful, then the program is terminated, and the program is optionally re-launched. Re-launching the program allows the program to run, allocating memory as appropriate to the program (and optionally resulting in one or more other programs being terminated). Whether the program is re-launched can vary based on the type of access (e.g., the program may be re-launched if the access is due to the suspended program being made active again, but may not be re-launched if the access is due to kernel mode code attaching to the memory space of the suspended program).

FIG. 1 illustrates an example system 100 employing the using memory compression to reduce memory commit charge in accordance with one or more embodiments. The system 100 is implemented by a computing device and includes a memory manager 104, a storage device 106, and paged memory 108. Generally, the memory manager 104 manages storage of data in the paged memory 108. The memory manager 104 includes a memory controller 110 and a memory allocator 112. The memory allocator 112 allocates portions of the paged memory 108 to various programs 114 in the system 100. The portion of the paged memory 108 allocated to a program 114 is also referred to as the address space of the program 114. The memory controller 110 controls the transferring of pages of memory between the paged memory 108 and the storage device 106, as well as the compression of different portions of the paged memory 108.

A program 114, when running, is also referred to herein as a process (which is an instance of a running program 114), so portions of the paged memory 108 allocated to a program 114 are also referred to as allocated to a process of the program 114. The pages allocated to a process are owned by or dedicated to that process and are used by that process and no other process (and thus are also referred to as private pages). The programs 114 can be applications, operating system programs, or other components or modules. The memory manager 104 receives requests from these programs 114 to retrieve data from the paged memory 108 and to write data to the paged memory 108. The paged memory 108 can be, for example, any type of CPU (Central Processing Unit) addressable memory, such as volatile memory (e.g., RAM) or nonvolatile memory (e.g., Flash memory).

The memory controller 110 manages the paged memory 108 using paging. The memory controller 110 organizes the memory 108 (e.g., RAM) into pages, which are a particular (e.g., fixed) size unit of data. The act of paging refers to reading data in units of pages from the backing file (also referred to as the swap file), which is page file 116 in system 100, when the data is not in the memory 108. The act of paging also refers to writing dirty (modified) data back in units of pages into the page file 116. The memory pages are thus also referred to as page file backed memory pages. Such paging techniques are well known to those skilled in the art.

In response to a request for memory allocation for a program, the memory allocator 112 allocates a commit charge for the requested amount of memory, which guarantees that if a virtual address in that memory were to be accessed at some point, physical pages in memory would be made available to the program. This request is typically received from the program itself. The content (e.g., data) of pages of the memory allocated to the program may be transferred to and from the page file 116 at different times, but that transfer is managed by the memory controller 110 and the program has access to the memory that is allocated to the program.

Alternatively, the memory allocation 112 and the programs 114 follow a delayed memory commit approach. In the delayed memory commit approach, no actual commit allocation happens when a memory allocation request is made by the program 114. Instead, commit is allocated on-demand when the program 114 first writes to the allocated memory. If commit cannot be allocated at that time, an exception is raised and/or the program is terminated.

The system 100 includes a program termination preparation module 118 and a program access module 120. The program termination preparation module 118 manages putting the program in a state where the program can be terminated (also referred to as a terminatable state). This can involve communicating with the program so that the program saves a processing state of the program, which refers to the various data, settings, or other information used by the program. By saving the processing state of the program, if the program is terminated the program can be subsequently re-launched and returned to the same processing state as it had prior to being terminated. Putting a program in a state where the program can be terminated also includes releasing at least some of the memory commit for the program, as discussed in more detail below. In one or more embodiments, a program that is put in a state where the program can be terminated is suspended, which refers to the program not running on the system 100 (e.g., the program is not scheduled for execution by any processors of the system 100). Alternatively, a program can be put in a state where the program can be terminated without suspending the program.

In one or more embodiments, the system 100 follows a suspend commit release approach. In the suspend commit release approach, the program termination preparation module 118 manages putting the program in a state where the program can be terminated as discussed above.

Alternatively, the system 100 can follow a runtime commit release approach. In the runtime commit release approach, a program is considered terminatable at all times, even when the program is active (e.g., running). Memory commit can be saved at runtime when the application is still active (but terminatable) such that the commit charge for the subset of pages in the address space that are compressed can be released as soon as the pages are compressed into compressed memory pages. In this approach (e.g., used in conjunction with the delayed memory commit approach discussed above), the storage for the compressed data (the compressed memory pages) charges its own commit. When the program accesses a commit-released page, commit is re-charged, a physical page is allocated, and data is decompressed from the compressed store into the physical page. If commit charge fails (the commit charge cannot be re-acquired), then an exception is raised (and/or the program terminated).

The program access module 120 manages allowing access to memory of a program that has been suspended or otherwise made terminatable. This allowing access can include resuming running of the program, such as re-launching of a program that was terminated or resuming running of a suspended program. This allowing access can also include re-acquiring at least some of the memory commit charge previously allocated to a program so that another program can access the memory, as discussed in more detail below.

Figure 2A:
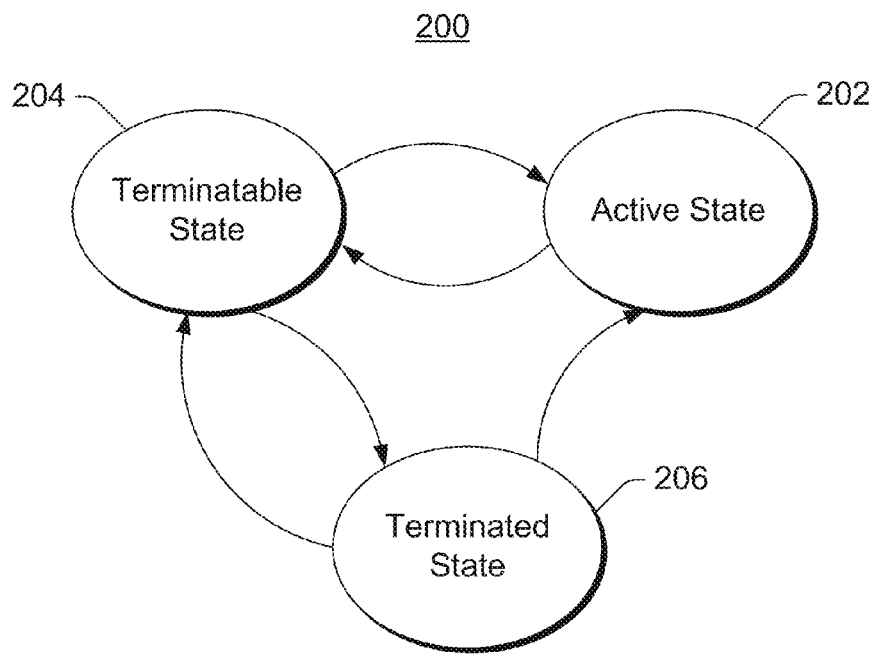
FIGS. 2A and 2B illustrate example state diagrams showing different states in which a program can be in accordance with one or more embodiments.
Figure 2B:
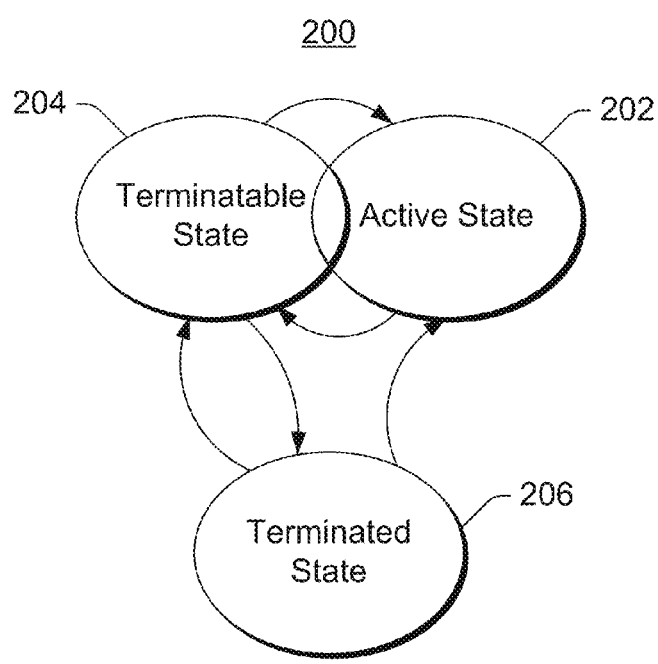

FIGS. 2A and 2B illustrate example state diagrams 200 showing different states in which a program can be in accordance with one or more embodiments. The state diagram 200 includes an active state 202, a terminatable state 204, and a terminated state 206. A program can transition between different ones of the states 202, 204 and 206 as illustrated by the arrows. From the terminatable state 204, the program can transition to the active state 202 or the terminated state 206. From the terminated state 206, the program can transition to the terminatable state 204 or the active state 202.

In one or more embodiments as illustrated in FIG. 2A, the active state 202 and the terminatable state 204 do not overlap. Thus, in such embodiments the program can be active or terminatable, but not both active and terminatable concurrently. Alternatively, as illustrated in FIG. 2B, the active state 202 and the terminatable state 204 partially overlap. Thus, in such embodiments, the program can be active but not terminatable, terminatable but not active, or both active and terminatable concurrently.

In the active state 202, the program is running (e.g., is being scheduled for execution by one or more processors of the system or device running the program). While in the active state 202, the program is able to access the memory that has been allocated to the program. From the active state 202, the program can transition to the terminatable state 204, such as when the program is suspended or otherwise to be put in a state where the program can be terminated.

In the terminatable state 204, the program is in a state where the program can be terminated (e.g., the program is suspended). While transitioning from the active state 202 to the terminatable state 204, the program saves the processing state of the program so that if the program is terminated, the program can be subsequently re-launched and returned to the same processing state as it had prior to being transitioned to the terminatable state 204. While in the terminatable state 204, the program is not able to access the memory that has been allocated to the program, and at least some of the memory commit charge that has been allocated to the program may be released, as discussed in more detail below.

From the terminatable state 204, the program can transition to the active state 202. Transition to the active state 202 can occur due to various different events, such as a user request to run the program, a request by another program to attach to the memory space of the program, and so forth. Also from the terminatable state 204 the program can transition to the terminated state 206. Transition to the terminated state 206 can occur due to various different events, such as a user request to close the program, a determination that the memory previously allocated to the program is to be used for one or more additional programs, and so forth.

In the terminated state 206, the program is not running. The program is not loaded into memory (e.g., RAM) of the system or computing device that would run the program, although is stored on another storage device and can be loaded into memory of the system or computing device. From the terminated state 206, the program can transition to the active state 202. Transition to the active state 202 can occur due to various different events, such as a user request to run the program. Also from the terminated state 204 the program can transition to the terminatable state 204. Transition to the terminatable state 204 can occur due to various different events, such as a user request to load but not run the program.

Returning to FIG. 1, the memory controller 110 manages compression of memory used by a program. The memory used by a program refers to memory pages that have been instantiated by the program or otherwise have been accessed by (e.g., to write or store data) the program. Compressing the memory of or used by a program refers to compressing the content of (e.g., data stored in) one or more memory pages of the memory allocated to the program. Any of a variety of different public and/or proprietary compression techniques can be used to compress a memory page. For example, a memory page can be compressed using run-length encoding compression algorithms, LZW compression algorithms, Huffman coding algorithms, and so forth. Multiple different compression algorithms can optionally be employed, such as different compression algorithms for different types of content. For example, one compression algorithm may be used for alphanumeric and/or text content, another compression algorithm may be used for image content, and another compression algorithm may be used for audio content. The compression technique used to compress a memory page is typically a lossless compression algorithm, although in certain circumstances (e.g., for certain image and/or audio content) a lossy compression algorithm may alternatively be used. The particular compression algorithm may also be device dependent, where a faster device (e.g., with a more powerful one or more processors) may be configured with a more processor-intensive compression algorithm that compresses better whereas a slower device (e.g., with a less powerful one or more processors) may be configured with a less processor-intensive algorithm that does not compress as well.

Memory used by a program can be compressed at different times. In one or more embodiments, memory used by a program is compressed while the program is running. The memory controller 110 can use any of a variety of different rules or criteria to determine which memory pages are compressed. For example, all memory pages used by program may be compressed, memory pages that have not been accessed by the program for a threshold amount of time can be compressed, memory pages that are being written out to a page file can be compressed, and so forth.

Additionally or alternatively to compressing memory while the program is running, memory of the program can be compressed in response to the program transitioning to a terminatable state. The memory controller 110 can compress all of the memory pages that are used by the program (and have not already been compressed), or alternatively apply other rules or criteria to determine which memory pages are compressed. In one or more embodiments, the memory controller 110 compresses all memory pages in the memory allocated to the program that have been accessed by (are instantiated by) the program. Memory pages that have not been accessed by the program would store no content for the program, and thus would have no content to compress.

The program termination preparation module 118 manages putting the program in a state where the program can be terminated. This includes communicating with the memory controller 110 to compress memory pages that have not already been compressed. Additionally, the program termination preparation module 118 determines an amount of memory commit for the program that can be released. The program termination preparation module 118 stores the compressed memory pages to the paged memory 108 and/or the storage device 106. The amount of memory commit for the program that can be released can vary based on the manner in which the compressed memory pages are stored.

In one or more embodiments, the program termination preparation module 118 writes the compressed memory pages to one or more additional files (other than the page file 116) of the storage device 106. In this situation, the compressed memory pages are stored in neither the paged memory 108 nor the page file 116, and thus all of the memory commit for the program can be released. For example, assume that 100 Megabytes (MB) of memory is committed to the program, and that the memory pages used by the program can be compressed so that they take, in compressed form, 40 MB of memory. In this example, the contents of the 40 MB of memory can be written to a file of the storage device, and the 100 MB of memory commit for the program can be released.

Alternatively, the program termination preparation module 118 writes the compressed memory pages to the paged memory 108 (after which one or more pages may be transferred to the page file 116 by the memory controller 110). In this situation, the compressed memory pages are stored in the paged memory 108 or the page file 116, and the amount of memory commit that can be released is the amount committed to the program less the amount of memory into which the memory pages were compressed. For example, assume that 100 MB of memory is committed to the program, and that the memory pages used by the program can be compressed so that they take, in compressed form, 40 MB of memory. In this example, the memory commit for the 40 MB of compressed memory cannot be released, but an amount equal to the difference between the amount of memory committed to the program (100 MB) and the amount of memory into which the memory pages were compressed (40 MB) can be released (60 MB can be released). This example assumes that the memory pages into which the data is compressed do not themselves take up any additional memory commit. If the memory pages into which the data is compressed do themselves take up additional memory commit, then the entire 100 MB of memory commit for the program can be released.

The program termination preparation module 118 notifies the memory allocator 112 of the amount of memory commit for the program that can be released, and that memory commit is released. The memory allocator 112 maintains a record (e.g., in storage device 106, paged memory 108, or other memory or storage of the system 100) of the amount of memory commit for the program that is released. This record of the released amount of memory commit for the program can be used in situations in which the application is subsequently resumed, as discussed in more detail below.

Alternatively, in some situations memory pages are released at runtime as discussed above. In such situations, the program is active and memory commit is released on a per-page basis as memory pages are compressed, and an attempt is made to re-acquire the memory commit in response to the program accessing a compressed memory page, as discussed above. In such situations, the memory allocator 112 releases memory pages as they are compressed (e.g., and written to memory pages in a compressed store), and further maintains a record that identifies which memory pages committed to a program have had their memory commit released. This record (e.g., a per-page record of each memory page) is used by the memory allocator 112 to determine whether memory commit for a memory page is to be re-acquired if the memory page is subsequently accessed. If memory commit has not been released for a particular page, then the memory commit for that particular page need not be re-acquired. However, if memory commit has been released for a particular page, then an attempt is made to re-acquire the memory commit for that particular page.

Releasing memory commit for the program results in conservation of the memory commit in the system 100. The memory commit that was previously committed to a program that is not able to access the memory at the current time anyway (e.g., due to the program being suspended) is released, allowing the memory commit to be consumed by other programs. For example, if 60 MB of memory commit is released due to a program being suspended, that 60 MB can be allocated to another program (and thus become memory commit of that other program). It should be noted that if the program is not suspended, then the program may attempt to access a commit-released memory page, at which point the memory manager will attempt to re-acquire the commit for the memory page, allocate a physical page (if the attempt to re-acquire the commit is successful), and decompress compressed data into that physical page.

The program access module 120 manages allowing access to memory of a program that has been suspended or terminated. While in the terminatable state, the memory allocated to the program cannot be directly accessed by the program itself or other programs because the content is compressed and the memory into which the content (if decompressed) would be placed has been released. Various events can occur that include requests to access the address space of a program in the terminatable state. In response to such an event, the program access module 120 manages allowing access to at least some of the memory previously allocated to the program by attempting to re-obtain (also referred to as re-acquire) the memory commit for at least some of the memory that was previously committed to the program and released. If the attempt to re-obtain the memory commit for at least some of the memory is successful, then the requested access to the address space of the program is permitted. However, if the attempt to re-obtain the memory commit for at least some of the memory is unsuccessful, then the program is terminated (execution of the program ceases). The program can optionally be re-launched, resulting in a new memory allocation being made to the program (which may result in one or more other programs being transitioned to a terminatable or terminated state).

In situations in which running of a program has been suspended (or otherwise placed in a non-active state), the program access module 120 can resume running of the program in response to various events. In one or more embodiments, these events include a request to resume running of the program, such as a user input requesting to make the application an active application (an application that is currently running on the computing device). Additionally or alternatively, these events can include other requests, such as a request by another program or code to attach to the address space of the program. These other programs or code are typically executed in a more privileged space (e.g., in a kernel mode) than the program the address space of which is being accessed. These other programs can perform various operations on the address space, such as analyze the address space to identify malware.

In such situations, the program access module 120 can attempt to re-obtain the memory commit for all of the memory that was previously committed to the program and released, or alternatively only some of the memory that was previously committed to the program and released. For example, the program control module 120 can attempt to re-obtain memory commit for enough memory to allow a particular number of memory pages (e.g., the memory pages including the portions of the address space being accessed) to be accessed. In such situations, the memory controller 110 ensures that pages that have not had their commit charge re-obtained cannot be accessed (in order to avoid violating the rules of commit limits).

The program access module 120 can also determine whether to attempt to re-obtain some or all of the memory commit that was previously committed to the program and released based on the type of access being performed. For example, if the type of access is a user request to resume running the program, then the program access module 120 attempts to re-obtain all of the memory commit that was previously committed to the program and released. By way of another example, if the type of access is a request by another program to attach to an address space of the program, then the program access module 120 attempts to re-obtain enough memory commit to allow decompression and access to the memory pages including the portions of the address space being accessed.

The program access module 120 can also determine that, for certain types of accesses, the memory commit that was previously committed to the program and released need not be re-obtained. In one or more embodiments, if the type of request is a request by another program to attach to and read from an address space of the program, then the memory commit that was previously committed to the program and released need not be re-obtained. Memory commit for a memory page that is already backed (e.g., in compressed form) in the page file 116 need not be re-obtained if the memory page is going to be read because no changes will be made to the memory page that would result in the memory page needing to be saved back to the page file or maintained in the paged memory 108. However, if the type of request is a request by another program to attach to and perform a non-read access (e.g., a write access, a memory page lock access, etc.), then the program access module 120 attempts to re-obtain enough memory commit to allow decompression and access to the memory pages including the portions of the address space being accessed.

In other situations as discussed above, where the memory manager follows a runtime commit release approach, the program remains active and the program access module 120 need not resume running of the program. Rather, when a request (e.g., by the program, or a request by another program to attach to and read from an address space of the program) to access a commit-released memory page of the program is received, the commit is re-charged, a physical page is allocated, and data is decompressed from the compressed store into the physical page. If commit charge fails (the commit charge cannot be re-acquired), then an exception is raised (and/or the program terminated) as discussed above.

Figure 3:
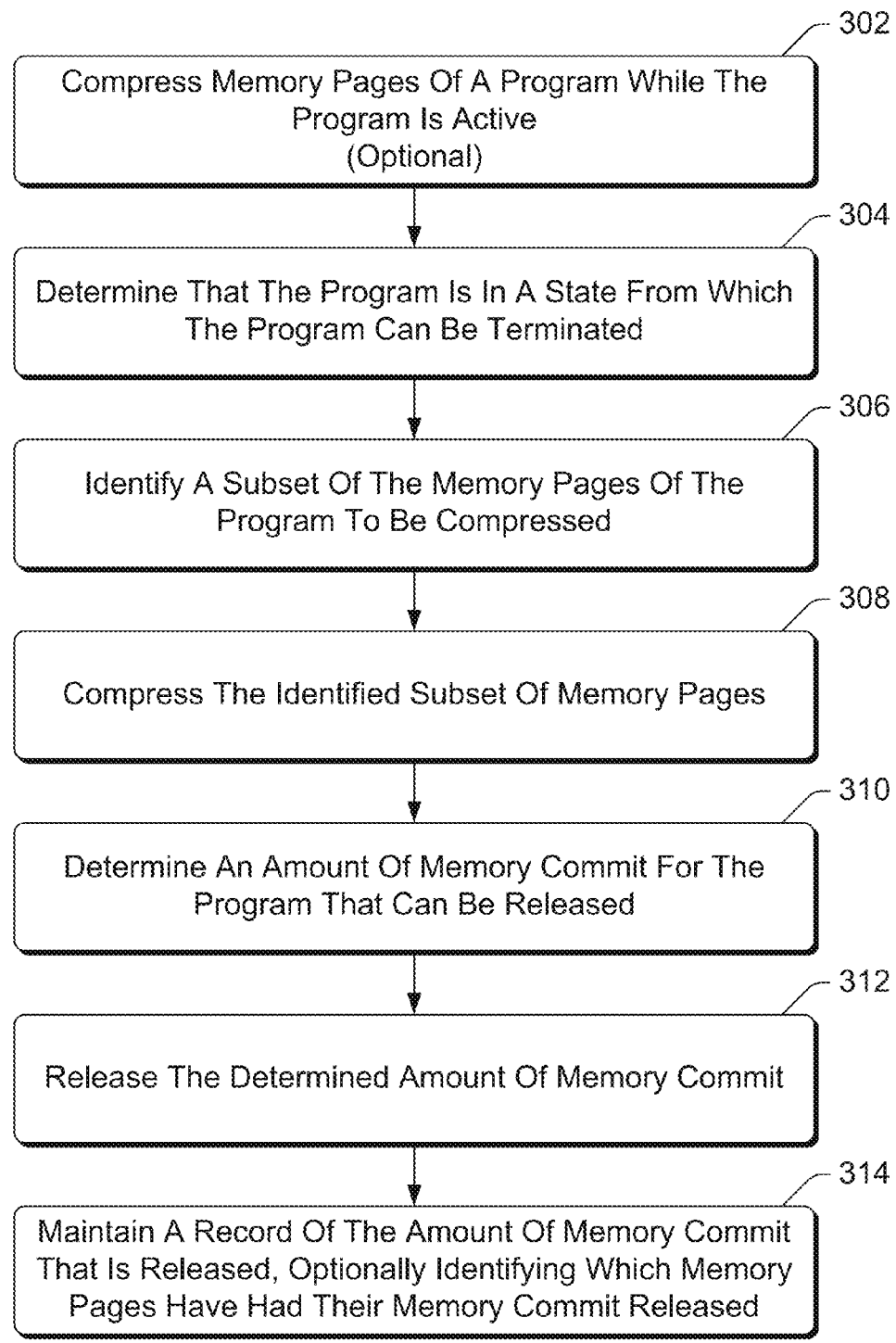
FIG. 3 is a flowchart illustrating an example process for conserving memory commit when a program is terminatable in accordance with one or more embodiments.

FIG. 3 is a flowchart illustrating an example process 300 for conserving memory commit when a program is terminatable in accordance with one or more embodiments. Process 300 is carried out by a memory manager and program termination preparation module, such as the memory manager 104 and program termination preparation module 118 of FIG. 1, and can be implemented in software, firmware, hardware, or combinations thereof. Process 300 is shown as a set of acts and is not limited to the order shown for performing the operations of the various acts. Process 300 is an example process for conserving memory commit when a program is terminatable; additional discussions of conserving memory commit when a program is terminatable are included herein with reference to different figures.

In process 300, memory pages of a program are optionally compressed while the program is active (act 302). At least some of the memory pages of a program can optionally be compressed by the memory controller to conserve memory while the program is running as discussed above. However, in alternate embodiments, no such compression of memory pages while the program is active Occurs.

At some point a determination is made that a program is in a state from which the program can be terminated (act 304). As discussed above, the program can be in a state from which the program can be terminated by being transitioned to a terminatable state, or by being concurrently in an active and terminatable state.

A subset of the memory pages of the program to be compressed is identified (act 306). The subset of memory pages to be compressed are the memory pages included in the memory allocated to the program that have been accessed by (are instantiated by) the program and that have not already been compressed (e.g., in act 302).

The identified subset of memory pages is compressed (act 308). The memory pages can be compressed using any of a variety of different compression algorithms or techniques as discussed above.

An amount of memory commit for the program that can be released is determined (act 310). The amount of memory commit that can be released is equal to the value derived by subtracting the amount of memory into which the memory pages were compressed from the amount of memory commit for the program. The memory commit for non-instantiated pages (memory pages of the program that were not used by the program) is included in the amount of memory commit for the program that can be released. The amount of memory commit that can be released can be less than all of the memory commit for the program (e.g., in situations in which the compressed memory is stored in a paged memory or page file), or all of the memory commit for the program (e.g., in situations in which the compressed memory is stored in an additional file on a storage device other than the page file, or in situations in which the compressed memory has charged commit for itself).

It should be noted that in some situations, certain memory commit for the program cannot be released due to guarantees made to other programs or code (e.g., kernel mode drivers). Such memory commit is excluded from the amount of memory commit that can be released as determined in act 310. Thus, the amount of memory commit that can be released is equal to the value derived by subtracting, from the amount of memory commit for the program, the amount of memory into which the memory pages were compressed and the amount of memory commit that cannot be released due to guarantees made to other programs or code.

The amount of memory commit determined in act 310 is released (act 312). Releasing the memory commit allows that amount of memory commit to be consumed by other programs that are running on the computing device. The commit charge for memory pages of the program that were not used by the program is reduced to zero, and the commit charge for memory pages that were used by the program (and subsequently compressed) is reduced by the compression ratio.

A record of the amount of memory commit that is released is maintained (act 314). This record allows a determination to be subsequently made as to how much memory commit is to be re-obtained for a program. In one or more embodiments, the record includes an indication of which memory pages committed to a program have had their memory commit released, allowing the memory manager to know whether the memory commit for a memory page is to be re-acquired if the memory page is accessed as discussed above.

Figure 4:
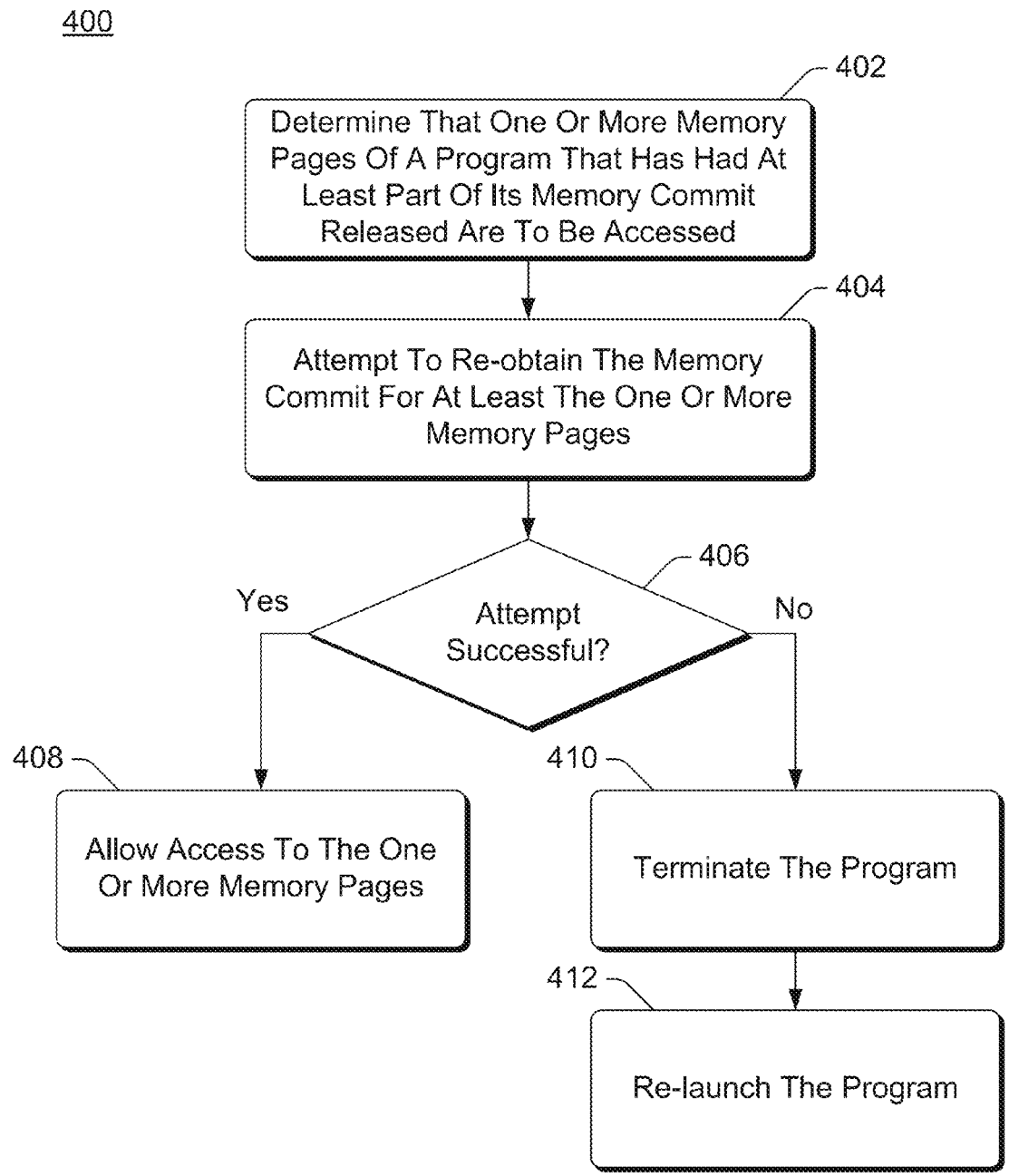
FIG. 4 is a flowchart illustrating an example process for allowing access to memory of a program that has been suspended or otherwise made terminatable in accordance with one or more embodiments.

FIG. 4 is a flowchart illustrating an example process 400 for allowing access to memory of a program that has been suspended or otherwise made terminatable in accordance with one or more embodiments. Process 400 is carried out by a memory manager and program access module, such as the memory manager 104 and program access module 120 of FIG. 1, and can be implemented in software, firmware, hardware, or combinations thereof. Process 400 is shown as a set of acts and is not limited to the order shown for performing the operations of the various acts. Process 400 is an example process for allowing access to memory of a program that has been suspended or otherwise made terminatable; additional discussions of allowing access to memory of a program that has been suspended or otherwise made terminatable are included herein with reference to different figures.

In process 400, a determination is made that one or more memory pages of a program that has had at least part of its memory commit released are to be accessed (act 402). The one or more memory pages can be accessed as part of various different events as discussed above.

An attempt is made to re-obtain the memory commit for at least the one or more memory pages of the program (act 404). This attempt can be an attempt to re-obtain all of the memory commit that was released (e.g., as indicated in the record maintained in act 314 of FIG. 3), or a subset of the memory commit (e.g., memory commit for particular memory pages being accessed) as discussed above.

Process 400 proceeds based on whether the attempt in act 404 is successful (act 406). If the attempt in act 404 is successful, then access to the one or more memory pages is allowed (act 408). However, if the attempt is unsuccessful, then the program is terminated (act 410) and optionally re-launched (act 412). It should be noted that by terminating and re-launching the program, memory is allocated to the program in response to a memory allocation request for the program, which may result in one or more other programs on the computing device being terminated.

The actions taken in terminating the program can vary based on implementation. In one or more embodiments, terminating the program includes tearing down the address space of the program (as though the program was exiting), and triggering forceful thread termination for all threads in the process that is the running program (e.g., which queues messages to the threads to wake up from their suspended state and terminate).

In one or more embodiments, care is taken when terminating a program so that synchronization with other programs in the computing device is maintained. The program is terminated in act 410 in a manner that is consistent with what the program as well as any other program (e.g., that may have attached to the program being terminated) expects. For example, the program is terminated in act 410 only if no other program is currently attached to the address space of the program.

Returning to FIG. 1, in one or more embodiments the memory management system 102 provides additional support to facilitate saving memory commit. The memory management system 102 allows a program 114 to indicate that a particular amount of memory commit previously allocated to the program 114 can be released if the memory management system 102 desires. By providing such an indication, the program 114 is acknowledging that the program 114 can accept a loss of memory commit previously allocated to the program 114. Such an indication can be provided, for example, by invoking an application programming interface (API) exposed by the memory allocator 112. Providing the indication allows the memory allocator 112 to release some of the memory commit previously allocated to the program 114 and allocate the memory commit to another program that requests allocation of memory.

The techniques discussed herein support various usage scenarios. The techniques discussed herein conserve memory commit in a computing device by reducing the amount of memory commit allocated to programs in the computing device. This increases the number of programs that can be run or suspended in a computing device at any given time without having to terminate the programs. This also decreases the amount of paged memory and/or storage device space (for the page file) needed to allow a given number of programs to be run or suspended in a computing device at any given time without having to terminate any of the programs.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
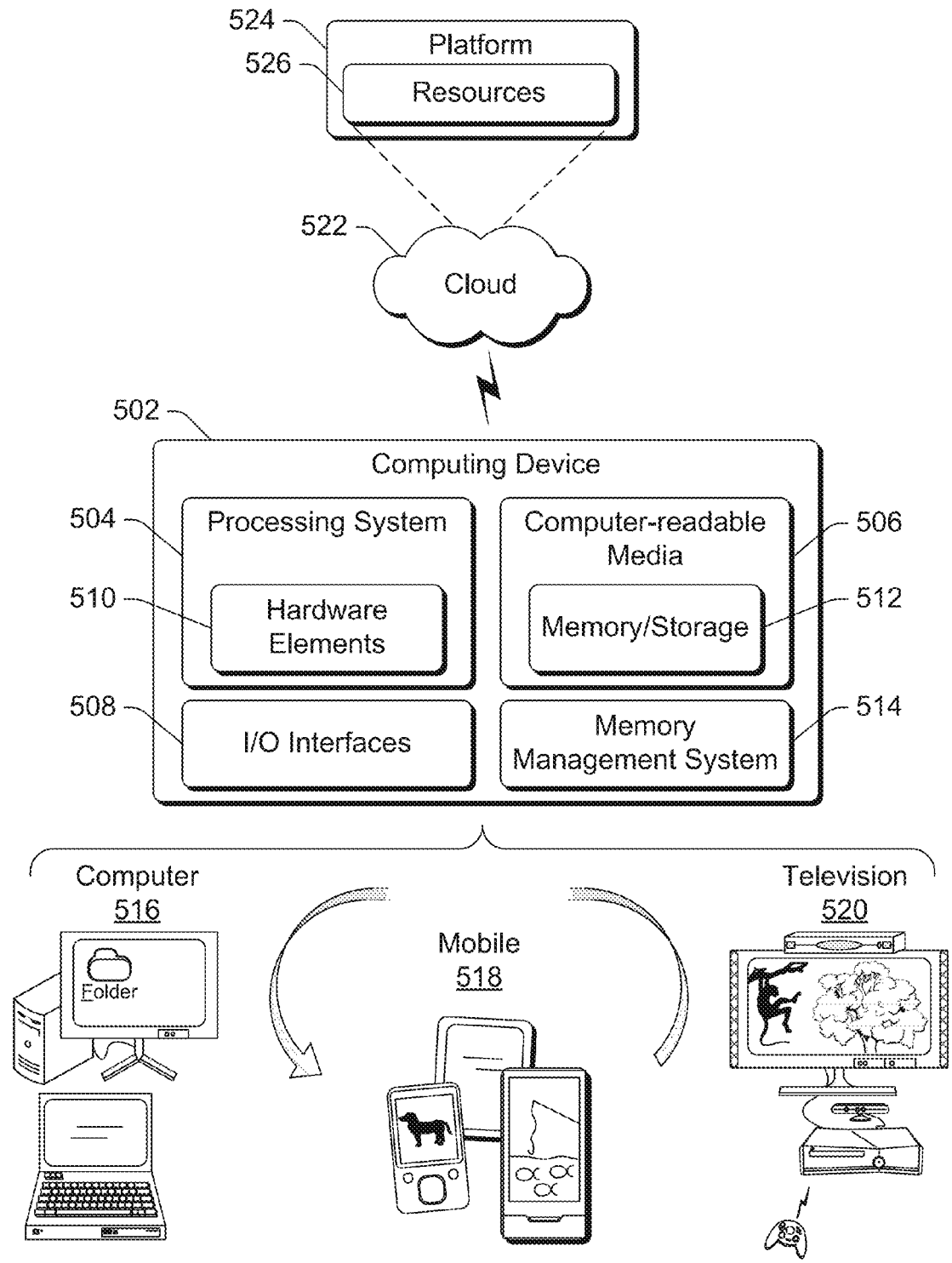
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Computing device 502 also includes a memory management system 514. The memory management system 514 provides various functionality for conserving memory by reducing memory commit charge as discussed above. The memory management system 514 can implement, for example, the memory management system 102 of FIG. 1. Although illustrated as separate from the computer-readable media 506, it should be noted that the memory management system 514 can alternatively be implemented as part of the computer-readable media 506.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method of reducing an amount of memory commit for a program in a computing device, the method comprising: determining that the program is in a state from which the program can be terminated, an amount of memory having been committed to the program, the amount of memory being a memory commit for the program, a subset of the amount of memory committed to the program having been used by the program, and the amount of memory committed to the program including multiple memory pages; compressing the content of the memory pages in the subset of memory used by the program; determining an amount of the memory commit for the program that can be released; and releasing, after the subset of memory used by the program has been compressed, the determined amount of the memory commit for the program.

Alternatively or in addition to any of the above described methods, any one or combination of: the state from which the program can be terminated comprising a terminatable state in which a processing state of the program has been saved and to which the program can be subsequently resumed; the state from which the program can be terminated comprising an active state; the compressing comprising compressing, by a memory controller of the computing device, one or more of the subset of memory pages while the program is running and prior to the program being transitioned into the state from which the program can be terminated; the compressing the content of the memory pages comprising compressing, by a memory controller of the computing device in response to determining that the program has been transitioned into the state from which the program can be terminated, one or more of the subset of memory pages; the subset of memory used by the program comprising memory pages accessed by or instantiated by the program; the subset of memory used by the program comprising less than all of the memory committed to the program; the amount of memory commit for the program that can be released comprising all of the memory committed to the program; the amount of memory commit for the program that can be released comprising an amount equal to all of the memory committed for the program less an amount of memory used in which the compressed content is stored; and further comprising, after releasing the memory commit for the amount of memory that can be released: determining that one or more memory pages of the program are to be accessed, attempting to re-obtain the memory commit for at least the one or more memory pages of the program, allowing, in response to the attempt to re-obtain the memory commit being successful, the one or more memory pages to be accessed, and terminating and re-launching, in response to the attempt to re-obtain the memory commit being unsuccessful, the program.

A method of reducing an amount of memory commit for a program in a computing device, the method comprising: determining that one or more memory pages of the program are to be accessed, the program having had at least part of its memory commit released; attempting to re-obtain the memory commit for at least the one or more memory pages of the program; allowing, in response to the attempt to re-obtain the memory commit being successful, the one or more memory pages to be accessed; and terminating and re-launching, in response to the attempt to re-obtain the memory commit being unsuccessful, the program.

Alternatively or in addition to any of the above described methods, any one or combination of: the attempting to re-obtain the memory commit for at least the one or more memory pages comprising attempting to re-obtain all of the previously released memory commit for the program; the attempting to re-obtain the memory commit for at least the one or more memory pages comprising attempting to re-obtain memory commit for each of the one or more memory pages on a per-page basis as requests to access the memory page are received; the determining comprising determining that the one or more memory pages are to be accessed by code attaching to an address space of the program; the determining further comprising determining that the one or more memory pages of the program are to be accessed by a write request or a lock request from the code attaching to the address space of the program; further comprising allowing, without attempting to re-obtain memory commit for at least one of the one or more memory pages of the program, the one or more memory pages to be accessed in response to determining that the one or more memory pages of a program are to be accessed by a read request from the additional program; and the determining comprising determining that the one or more memory pages are to be accessed in response to a user request to run the program.

A computing device including a memory management system configured to conserve memory commit in the computing device, the memory management system comprising: a program termination preparation module configured to: determine that a program is in a state from which the program can be terminated, an amount of memory having been committed to the program, the amount of memory being a memory commit for the program, a subset of the amount of memory committed to the program having been used by the program, and the amount of memory committed to the program including multiple memory pages; have the content of the memory pages in the subset of memory used by the program compressed; determine an amount of the memory commit for the program that can be released; and release, after the subset of memory used by the program has been compressed, the determined amount of memory commit for the program; and a program access module configured to, after release of the commit charge for the amount of memory that can be released: determine that one or more memory pages of the program are to be accessed; attempt to re-obtain the memory commit for at least the one or more memory pages of the program; allow, in response to the attempt to re-obtain the memory commit being successful, the one or more memory pages to be accessed; and terminate and re-launch, in response to the attempt to re-obtain the memory commit being unsuccessful, the program.

Alternatively or in addition to any of the above described computing devices, any one or combination of: the memory management system further including a memory allocator configured to receive from the program an indication that a previously allocated amount of memory commit can be released if desired by the memory allocator, and to release the previously allocated amount of memory commit and allocate the previously allocated amount of memory commit to another program of the computing device; the program termination preparation module being further configured to have the content of the memory pages compressed, by a memory controller of the memory management system, in response to determining that the program has been transitioned into the state from which the program can be terminated; wherein to attempt to re-obtain the memory commit for at least the one or more memory pages is to attempt to re-obtain memory commit for each of the one or more memory pages on a per-page basis as requests to access the memory page are received; and wherein to determine that the one or more memory pages of the program are to be accessed is to determine that the one or more memory pages are to be accessed by code attaching to an address space of the program.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of reducing an amount of memory commit for a program in a computing device, the method comprising:
    determining that the program is in a state from which the program can be terminated, an amount of memory having been committed to the program, the amount of memory being a memory commit for the program, a subset of the amount of memory committed to the program having been used by the program, and the amount of memory committed to the program including multiple memory pages;
    compressing the content of the memory pages in the subset of memory used by the program;
    determining an amount of the memory commit for the program that can be released;
    releasing, after the subset of memory used by the program has been compressed, the determined amount of the memory commit for the program; and
    maintaining a record of the memory commit released.

2. The method as recited in claim 1, the state from which the program can be terminated comprising a terminatable state in which a processing state of the program has been saved and to which the program can be subsequently resumed.

3. The method as recited in claim 1, the state from which the program can be terminated comprising an active state.

4. The method as recited in claim 1, the compressing comprising compressing, by a memory controller of the computing device, one or more of the subset of memory pages while the program is running and prior to the program being transitioned into the state from which the program can be terminated.

5. The method as recited in claim 1, the compressing the content of the memory pages comprising compressing, by a memory controller of the computing device in response to determining that the program has been transitioned into the state from which the program can be terminated, one or more of the subset of memory pages.

6. The method as recited in claim 1, the subset of memory used by the program comprising memory pages accessed by or instantiated by the program.

7. The method as recited in claim 1, the subset of memory used by the program comprising less than all of the memory committed to the program.

8. The method as recited in claim 1, the amount of memory commit for the program that can be released comprising all of the memory committed to the program.

9. The method as recited in claim 1, the amount of memory commit for the program that can be released comprising an amount equal to all of the memory committed for the program less an amount of memory used in which the compressed content is stored.

10. The method as recited in claim 1, further comprising, after releasing the memory commit for the amount of memory that can be released:
    determining that one or more memory pages of the program are to be accessed;
    attempting to re-obtain the memory commit for at least the one or more memory pages of the program;
    allowing, in response to the attempt to re-obtain the memory commit being successful, the one or more memory pages to be accessed; and
    terminating and re-launching, in response to the attempt to re-obtain the memory commit being unsuccessful, the program.

11. A method of reducing an amount of memory commit for a program in a computing device, the method comprising:
- determining that one or more memory pages of the program are to be accessed, the program having had at least part of its memory commit released and a record of the memory commit released being maintained;
- attempting to re-obtain the memory commit for at least the one or more memory pages of the program, the attempting comprising utilizing the record of the memory commit released to determine an amount of memory to re-obtain;
- allowing, in response to the attempt to re-obtain the memory commit being successful, the one or more memory pages to be accessed; and
- terminating and re-launching, in response to the attempt to re-obtain the memory commit being unsuccessful, the program.

12. The method as recited in claim 11, the attempting to re-obtain the memory commit for at least the one or more memory pages comprising attempting to re-obtain all of the previously released memory commit for the program.

13. The method as recited in claim 11, the attempting to re-obtain the memory commit for at least the one or more memory pages comprising attempting to re-obtain memory commit for each of the one or more memory pages on a per-page basis as requests to access the memory page are received.

14. The method as recited in claim 11, the determining comprising determining that the one or more memory pages are to be accessed by code attaching to an address space of the program.

15. The method as recited in claim 14, the determining further comprising determining that the one or more memory pages of the program are to be accessed by a write request or a lock request from the code attaching to the address space of the program.

16. The method as recited in claim 15, further comprising allowing, without attempting to re-obtain memory commit for at least one of the one or more memory pages of the program, the one or more memory pages to be accessed in response to determining that the one or more memory pages of a program are to be accessed by a read request from the additional program.

17. The method as recited in claim 11, the determining comprising determining that the one or more memory pages are to be accessed in response to a user request to run the program.

18. A computing device including a memory management system configured to conserve memory commit in the computing device, the memory management system comprising:
- a program termination preparation module configured to:
  - determine that a program is in a state from which the program can be terminated, an amount of memory having been committed to the program, the amount of memory being a memory commit for the program, a subset of the amount of memory committed to the program having been used by the program, and the amount of memory committed to the program including multiple memory pages;
  - have the content of the memory pages in the subset of memory used by the program compressed;
  - determine an amount of the memory commit for the program that can be released;
  - release, after the subset of memory used by the program has been compressed, the determined amount of memory commit for the program;
  - maintain a record of the memory commit released; and
- a program access module configured to, after release of the commit charge for the amount of memory that can be released:
  - determine that one or more memory pages of the program are to be accessed;
  - attempt to re-obtain the memory commit for at least the one or more memory pages of the program;
  - allow, in response to the attempt to re-obtain the memory commit being successful, the one or more memory pages to be accessed; and
  - terminate and re-launch, in response to the attempt to re-obtain the memory commit being unsuccessful, the program.

19. The computing device as recited in claim 18, the memory management system further including a memory allocator configured to receive from the program an indication that a previously allocated amount of memory commit can be released if desired by the memory allocator, and to release the previously allocated amount of memory commit and allocate the previously allocated amount of memory commit to another program of the computing device.

20. The computing device as recited in claim 18, the program termination preparation module being further configured to have the content of the memory pages compressed, by a memory controller of the memory management system, in response to determining that the program has been transitioned into the state from which the program can be terminated.

* * * * *